United States Patent
Baumgart et al.

(10) Patent No.: US 11,280,361 B2
(45) Date of Patent: Mar. 22, 2022

(54) FASTENING DEVICE, A COMPONENT COMPRISING THE FASTENING DEVICE, AND METHOD FOR PRE-ASSEMBLING THE FASTENING DEVICE

(71) Applicant: Mahle International GmbH, Stuttgart (DE)

(72) Inventors: Tobias Baumgart, Winterbach (DE); Oliver Geffert-Fischer, Aichwald (DE)

(73) Assignee: Mahle International GmbH

( * ) Notice: Subject to any disclaimer, the term of this patent is extended or adjusted under 35 U.S.C. 154(b) by 54 days.

(21) Appl. No.: 16/846,267

(22) Filed: Apr. 10, 2020

(65) Prior Publication Data
US 2020/0325920 A1 Oct. 15, 2020

(30) Foreign Application Priority Data
Apr. 12, 2019 (DE) .......................... 102019205354.8

(51) Int. Cl.
*F16B 5/02* (2006.01)

(52) U.S. Cl.
CPC ..................... *F16B 5/02* (2013.01)

(58) Field of Classification Search
CPC ......... Y10T 29/49826; Y10T 29/49947; Y10T 29/49963; F16B 5/02
See application file for complete search history.

(56) References Cited

U.S. PATENT DOCUMENTS

| | | | |
|---|---|---|---|
| 5,094,579 A * | 3/1992 | Johnson | F02B 77/00 411/107 |
| 5,462,395 A | 10/1995 | Damm et al. | |
| 6,309,157 B1 | 10/2001 | Amann et al. | |
| 2005/0120667 A1 | 6/2005 | Mead | |

FOREIGN PATENT DOCUMENTS

| | | | |
|---|---|---|---|
| DE | 20 2009 017 674 U1 | 9/2010 | |
| DE | 10 2015 220 370 A1 | 4/2017 | |
| DE | 102015220370 A1 * | 4/2017 | ............ F16B 41/002 |

(Continued)

OTHER PUBLICATIONS

DE-102015220370-A1 English translation (Year: 2015).*

(Continued)

*Primary Examiner* — Jason L Vaughan
*Assistant Examiner* — Amanda Kreiling
(74) *Attorney, Agent, or Firm* — Fishman Stewart PLLC

(57) ABSTRACT

A fastening device for securing a component to a counter piece may include a collar screw having a thread, a screw head, and a circumferential collar formed therebetween, and a fastening section in which a through hole is formed, a radial stop projection and a radial clamping projection being located inside the through hole, the clamping projection being located radially opposite and radially offset to the stop projection in an insertion direction. The collar screw may be inserted into the through hole in the insertion direction, and, in a pre-assembly state, the collar may be axially supported on the stop projection in a pull-out direction. In the pre-assembly state, the collar may be axially supported on the clamping projection in the insertion direction, and the collar screw may be clamped between the stop projection and the clamping projection.

20 Claims, 7 Drawing Sheets

(56) References Cited

FOREIGN PATENT DOCUMENTS

| | | |
|---|---|---|
| EP | 0753675 A1 | 1/1997 |
| EP | 1 055 829 A2 | 11/2000 |
| GB | 2328990 A | 3/1999 |

OTHER PUBLICATIONS

English abstract for DE-10 2015 220 370.
Chinese Search Report dated Jun. 22, 2021 related to corresponding Chinese Patent Application No. 202010269595.6.
Chinese Office Action dated Jun. 29, 2021 related to corresponding Chinese Patent Application No. 202010269595.6.

* cited by examiner

FASTENING DEVICE, A COMPONENT COMPRISING THE FASTENING DEVICE, AND METHOD FOR PRE-ASSEMBLING THE FASTENING DEVICE

CROSS-REFERENCE TO RELATED APPLICATIONS

This application claims priority to German Patent Application No. DE 10 2019 205 354.8, filed on Apr. 12, 2019, the contents of which are hereby incorporated by reference in their entirety.

TECHNICAL FIELD

The invention relates to a fastening device for securing a component to a counter piece. The invention also relates to a method for pre-assembling the fastening device.

BACKGROUND

Fastening devices for securing a component to a counter piece by means of collar screws are already known. It thereby often happens that the component comprising the collar screws and the counter piece are produced and transported separately. The collar screws can thereby be pre-assembled in the component in a captive manner, as is described, for example, in DE 10 2015 220 370 A1. The collar screw is inserted into a through hole of the component in such a way here that the collar of the collar screw and a stop projection in the through hole engage axially behind one another. To be able to guide the collar of the collar screw past the stop projection, an elastic element is provided in the through hole. Said elastic element deforms when the collar is guided past the stop projection and prevents an unwanted release of the axial engagement between the collar of the collar screw and the stop projection. The screw head of the collar screw on the one hand and the axial engagement between the collar of the collar screw and the stop projection on the other hand thus prevent the collar screw from falling out of the component in an unwanted manner. When the collar screw cants, it can nonetheless be pulled out of the through hole too easily in a disadvantageous manner. The costs for the component are further increased by the elastic element in the through hole. The elastic element has to furthermore be pre-positioned in the through hole, so that the pre-assembly times and the pre-assembly effort are increased as well.

SUMMARY

It is thus the object of the invention to specify an improved or at least an alternative embodiment for a fastening device of the generic type, in the case of which the described disadvantages are overcome. It is a further object of the invention to provide a simplified method for pre-assembling the fastening device.

These objects are solved according to the invention by the subject matter of the independent claims. Advantageous embodiments are the subject matter of the dependent claims.

A fastening device is provided for securing a component to a counter piece. The fastening device is thereby preferably firmly connected to the component, which is to be fastened. Parts of the fastening device can in particular be formed integrally on the component. The fastening device thereby comprises a collar screw, wherein the collar screw has a thread, a screw head, and a circumferential collar formed between them. The fastening device furthermore comprises a fastening section of the component, in which a through hole comprising a radial stop projection, which is located on the inside, is formed. The collar screw is thereby inserted into the through hole in an insertion direction, and, in a pre-assembly state, the collar of the collar screw is axially supported on the stop projection of the through hole in a pull-out direction. According to the invention, a radial clamping projection, which is located on the inside and which is located radially opposite the stop projection and is axially offset to the stop projection in the insertion direction, is formed in the through hole. In the pre-assembly state, the collar is thereby axially supported on the clamping projection in the insertion direction, and the collar screw is clamped between the stop projection and the clamping projection.

In the fastening device according to the invention, the collar of the collar screw is clamped between the stop projection and the clamping projection, and, in the pre-assembly state, the collar screw is fixed securely in the fastening section of the component. The elasticity of materials, which are usually used for the collar screw and/or the component, is thereby already sufficient for clamping the collar screw, so that further conventionally necessary elements of a highly elastic material can be forgone. The fastening device according to the invention can thus be embodied to be robust and without a complex tolerance adjustment. The component can thus be produced in a simplified manner.

It goes without saying that the component can have several fastening devices and thus several fastening sections, each comprising a through hole. The respective collar screw can then be pre-assembled in the through hole of the respective fastening section. In response to the assembly of the component, the thread of the respective collar screw can then be engaged with a counter thread of the counter piece, and the component can thus be secured to the counter piece. The component and the counter piece can be, for example, a cylinder head screw and a cylinder head, a suction module, a fresh air distributor or a fresh air filter, as well as other components of a motor vehicle, which are to be screw-connected to one another.

It can advantageously be provided that a diameter of the collar is smaller than a diameter of the through hole in the region of the stop projection. The collar of the collar screw can thus be axially guided past the stop projection, and can be clamped between the stop projection and the clamping projection in response to the radial offsetting of the collar screw. The collar can advantageously have a circumferential slope rounding, which is directed radially to the inside. In response to the radial offsetting of the collar screw, the collar can then be clamped between the clamping projection and the stop projection with varying force. In the pre-assembly state, a longitudinal central axis of the collar screw, which is clamped in the through hole, is advantageously offset to a longitudinal central axis of the through hole.

To prevent a canting of the collar screw when transporting and aligning the component on the counter piece, the thread of the collar screw can be received completely in the through hole in the pre-assembly state and cannot axially protrude from the through hole. In the alternative or in addition, the screw head of the collar screw can be received completely in the through hole in the pre-assembly state and cannot axially protrude from the through hole.

It can adventurously be provided that the clamping projection and the stop projection are formed integrally on the fastening section of the component. The clamping projection and the stop projection can thereby be designed in such a way that they are slightly elastic due to their shape, and the collar of the collar screw can thus be securely clamped between them. The fastening section of the component can be formed, for example, of plastic. The entire component can advantageously also be formed of plastic. The stop projection can, for example, be horseshoe-shaped and the clamping projection can be a stop lug. In the alternative, the stop projection can be horseshoe-shaped and the clamping projection can be a resilient clamping lug. In the alternative, the stop projection can be horseshoe-shaped and the clamping projection can be a mounting bridge. In all above-mentioned cases, the stop projection and the clamping projection can be formed so as to be located radially opposite one another in the through hole. In the alternative, the stop projection can be horseshoe-shaped and the clamping projection can be formed by means of several support lugs, which are spaced apart from one another in the circumferential direction.

In the case of an advantageous further development of the fastening device, it can be provided that the clamping projection has a slope. The slope is thereby formed on the clamping projection so as to face away from the stop projection and is directed radially to the inside in the pull-out direction. The collar of the collar screw can then be guided on the slope in the pull-out direction and can be clamped between the stop projection and the clamping projection. The slope on the clamping projection thus acts as a positive guide for the collar of the collar screw. If the collar screw is axially shifted from the pre-assembly state in the insertion direction—thus for example engaged with the counter piece,—the collar of the collar screw is located downstream from the clamping projection in the pull-out direction. If the collar screw is now shifted in the pull-out direction—for example unscrewed from the counter piece,—the collar of the collar screw is guided on the slope in the pull-out direction and radially to the inside towards the stop projection. The collar is thereby clamped again between the stop projection and the clamping projection in the pre-assembly state. In this advantageous manner, the collar screw can also be fixed in the through hole in an axially captive manner after releasing the one component from the counter piece.

The invention also relates to a component, which is in particular a cylinder head cover or a suction module or a fresh air distributor or a filter housing. The component thereby comprises at least one above-described fastening device, wherein the fastening section of the respective fastening device forms a region of the component, which cannot be separated from the component. In other words, the component is formed or shaped, respectively, by the respective fastening section in some regions. The fastening section can thereby adjoin the component, for example integrally, or can be secured to the component by means of a substance-to-substance bond.

The invention also relates to a method for pre-assembling the above-described fastening device. First of all, the collar screw is thereby inserted into the through hole in the insertion direction, until the collar of the collar screw is axially supported on the clamping projection in the insertion direction. The collar screw is then offset radially to the stop projection in the through hole, until the collar of the collar screw is axially supported on the stop projection in the pull-out direction. The collar screw is subsequently offset radially closer to the stop projection in the through hole, until the collar of the collar screw is clamped between the stop projection and the clamping projection, and the collar screw is thus axially secured in the through hole.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically

DETAILED DESCRIPTION

Figure 3:
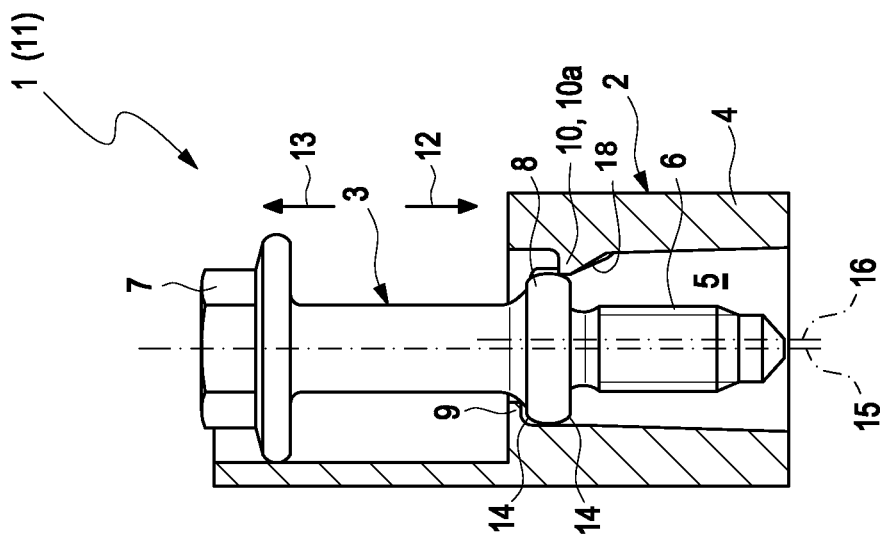
FIGS. 1 to 4 show sectional views of a fastening device according to the invention in response to the pre-assembly.

FIG. 1 to FIG. 4 show sectional views of a fastening device 1 according to the invention. The fastening device 1 is provided for securing a component 2 to a counter piece— not shown here. The fastening device 1 thereby comprises a collar screw 3 and a fastening section 4 of the component. A through hole 5, in which the collar screw 3 is arranged, is formed in the fastening section 4. The collar screw 3 thereby has a thread 6—only suggested here—a screw head 7, and a circumferential collar 8 formed between them. A radial stop projection 9 located on the inside and a radial clamping projection 10 located on the inside are formed in the through hole 5. The clamping projection 10 is located radially opposite to the stop projection 9 and is axially offset to the stop projection 9.

The fastening device 1 is thereby pre-assembled in a method 11 according to the invention. According to FIG. 1, the collar screw 3 is first inserted into the through hole 5 of the fastening section 4 in an insertion direction 12, until the collar 8 of the collar screw 3 is axially supported on the clamping projection 10 in the insertion direction 12. A diameter of the collar 8 of the collar screw 3 is thereby smaller than a diameter of the through hole 5 in the region of the stop projection 9, so that the collar 8 of the collar screw 3 can be axially guided past the stop projection 9. According to FIG. 2, the collar screw 3 is then shifted radially in the through hole 3 in the direction of the stop projection 9, until the collar 8 of the collar screw 3 is axially supported on the stop projection 9 in a pull-out direction 13. The insertion direction 12 and the pull-out direction 13 are thereby axially opposite one another. The offsetting of the collar screw 3 is suggested by means of an arrow P. In other words, the collar 8 of the collar screw 3 is guided below the stop projection 9. According to FIG. 3, the collar screw 3 is subsequently radially spaced apart farther from the clamping projection 10 in the through hole 5, until the collar 8 of the collar screw 3 is clamped between the stop projection 9 and the clamping projection 10. The collar screw 3 is thus secured in the through hole 5 in an axially captive manner and the fastening device 1 is now in a pre-assembly state. A further view of the pre-assembled fastening device 1 is shown in FIG. 4. It can be seen here that, in the pre-assembly state, a longitudinal central axis 15 of the collar screw 3 is axially offset to a longitudinal central axis 16 of the through hole 5.

In this exemplary embodiment, the component 2 and thus the fastening section 4 of the component 2 is formed of plastic. The stop projection 9 is thereby horseshoe-shaped and the clamping projection 10 is formed in the shape of a stop lug 10a. The elasticity of the plastic of the component 2 is thereby already sufficient for clamping the collar screw 3, so that additional conventionally necessary elastic elements can be forgone. The fastening device 1 can thus be embodied to be robust and without a complex tolerance adjustment, and the component 2 can be produced in a simplified manner. The collar 8 of the collar screw 3 furthermore has a circumferential slope rounding 14, which is directed radially to the inside. In response to the radial offsetting of the collar screw 3, the collar 8 can thus be clamped between the stop projection 9 and the clamping projection 10 with varying force. In the pre-assembly state according to FIG. 3, the thread 6 and the screw head 7 of the collar screw 3—and thus the collar screw 3—are received completely in the through hole 5. Neither the thread 6 nor the screw head 7 of the collar screw 3 thus protrudes from the through hole 5. A canting of the collar screw 3 when transporting and aligning the component 2 on the counter piece can thus be reliably prevented.

Figure 2:
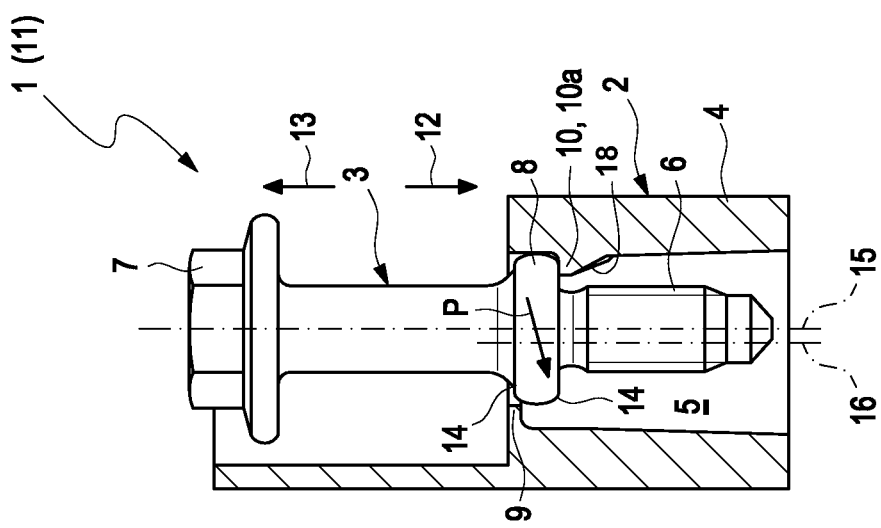
Figure 1:
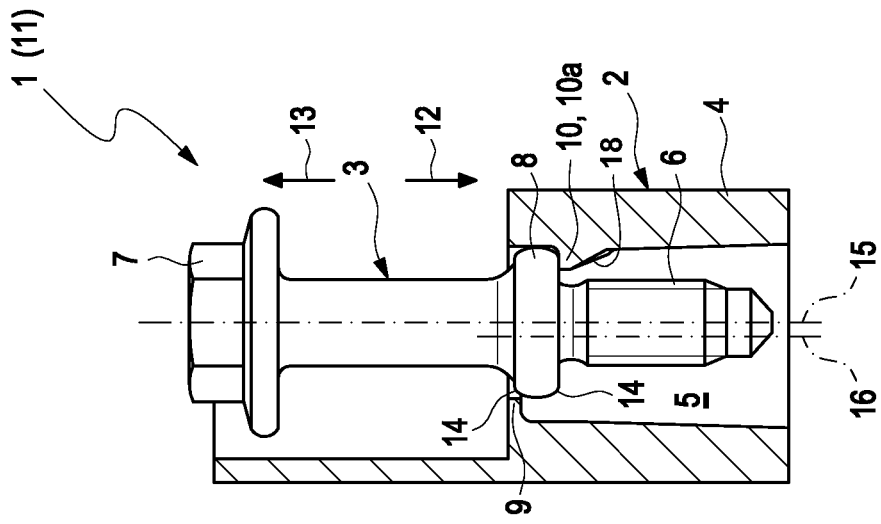
Figure 4:
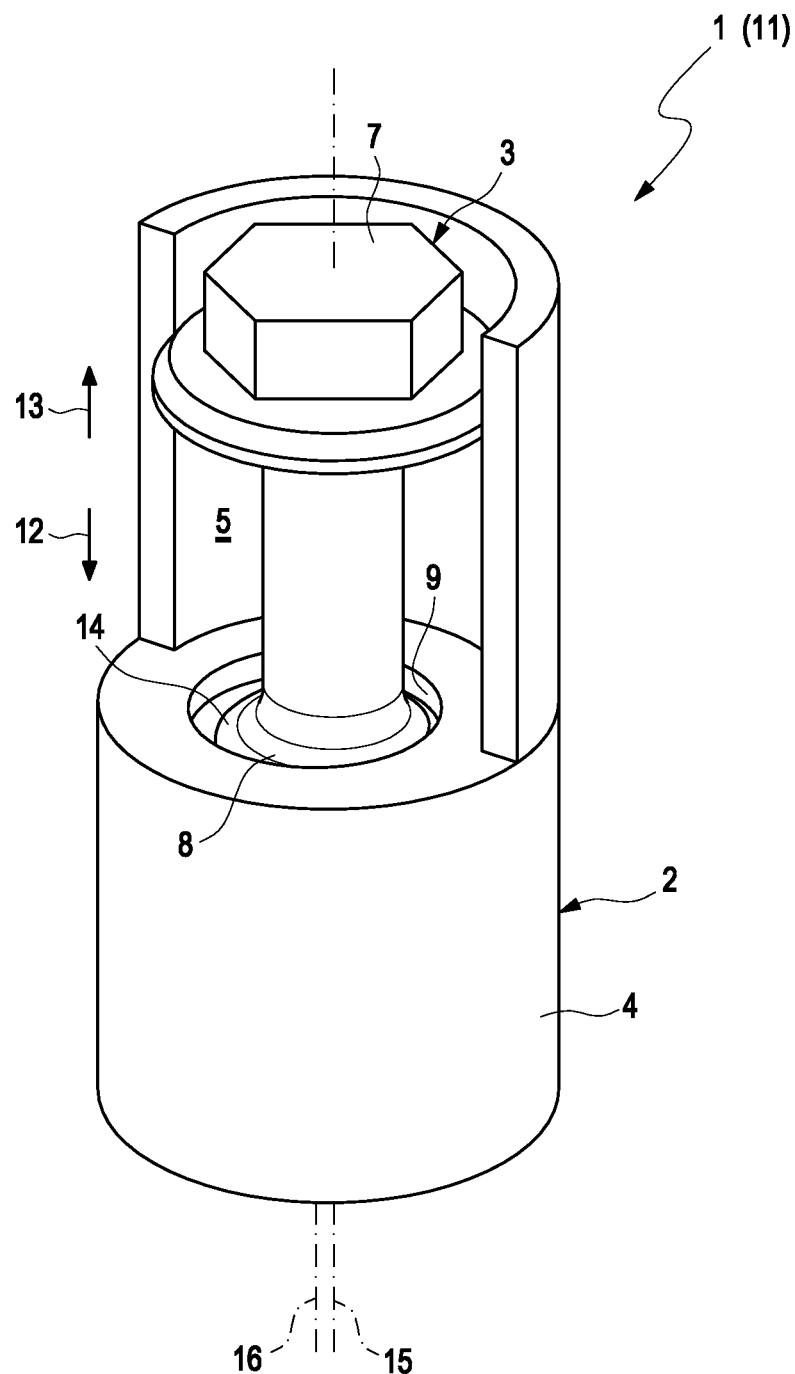

It can further be seen in FIG. 1 to FIG. 3 that the clamping projection 10 has a slope 18. The slope 18 is formed on the clamping protrusion 10 so as to face away from the stop projection 9 and leads radially to the inside or to the stop projection 9, respectively, in the pull-out direction 13. If the collar screw 3 is engaged with the counter piece—not shown here—the collar 8 of the collar screw 3 is located downstream from the clamping projection 10 in the pull-out direction 13. If, in response to releasing the collar screw 3 from the counter piece, the collar screw 3 is unscrewed therefrom, the collar screw 3 is pulled out of the counter piece—not shown here—in the pull-out direction 13. The collar 8 of the collar screw 3 is then guided on the slope 18 in the pull-out direction 13 and radially towards the stop projection 9, until the collar 8 of the collar screw 3 is clamped between the stop projection 9 and the clamping projection 10. The collar screw 3 can thus also be fixed in the through hole 5 in an axially captive manner after releasing the collar screw 3 or the component 2, respectively, from the counter piece.

Figure 5:
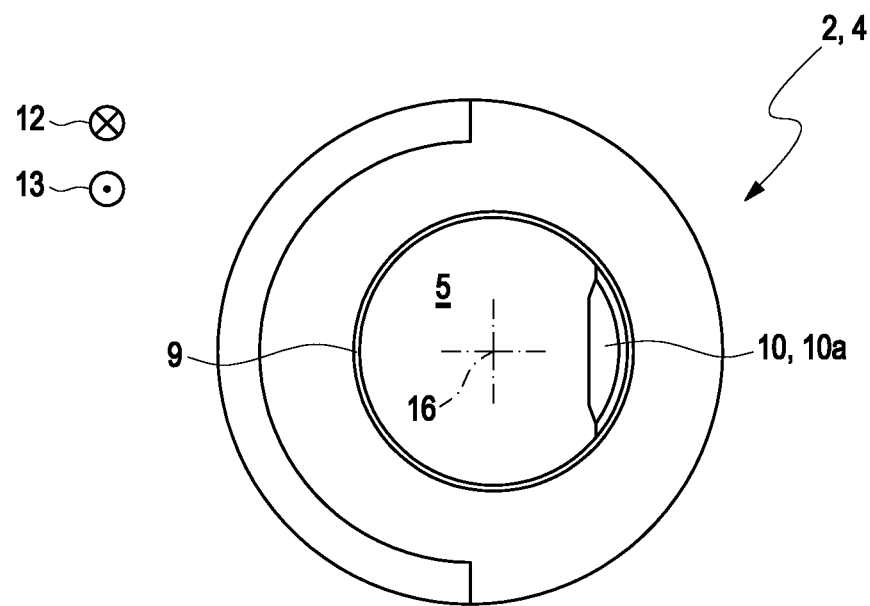
FIGS. 5 and 6 show views of a fastening section in the insertion direction and in the pull-out direction.
Figure 6:
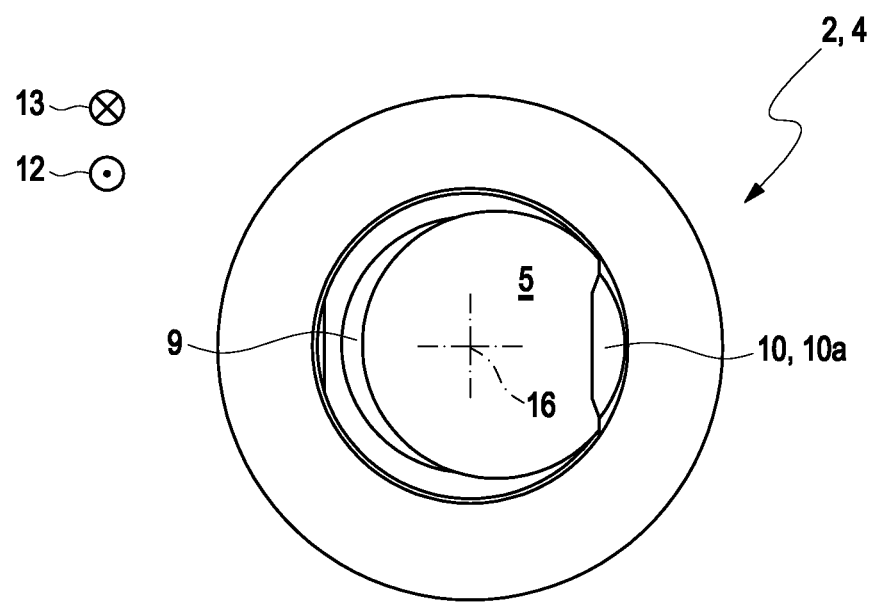
Figure 7:
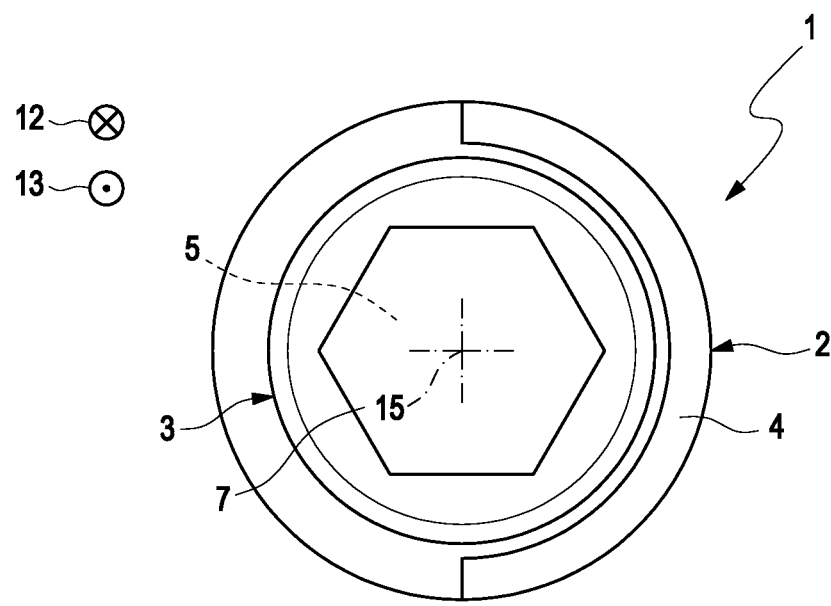
FIGS. 7 and 8 show views of a fastening section comprising a collar screw in the insertion direction and in the pull-out direction.
Figure 8:
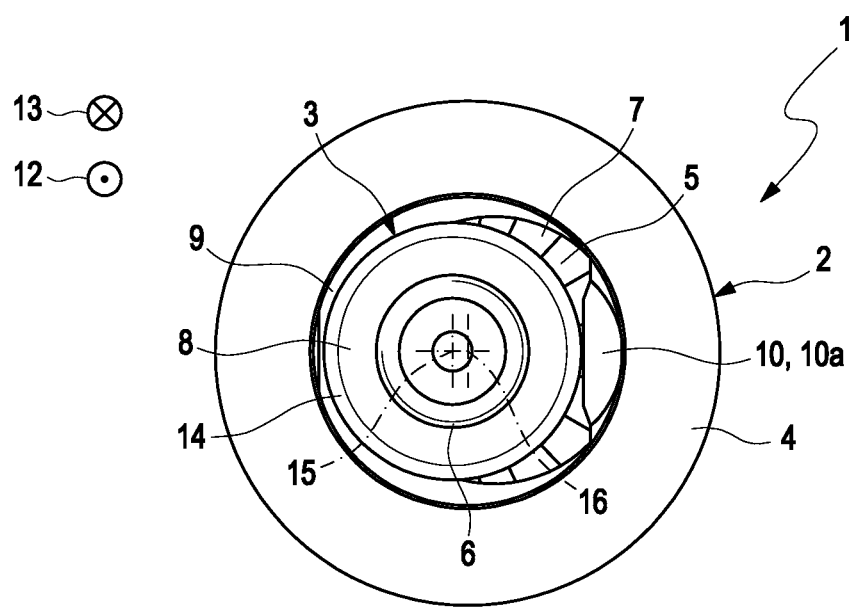

FIG. 5 and FIG. 6 show views of the fastening section 4 from FIG. 1 to FIG. 4 in the insertion direction 12 and in the pull-out direction 13. In other words, FIG. 5 shows a top view and FIG. 6 shows a bottom view onto the fastening section 4. Views of the fastening section 4 from FIG. 5 and FIG. 6 comprising the collar screw 3 in the insertion direction 12 and in the pull-out direction 13 are shown in FIG. 7 and FIG. 8. In other words, FIG. 7 shows a top view and FIG. 8 shows a bottom view onto the fastening section 4. The shape of the horseshoe-shaped stop projection 9 and of the clamping projection 10 in the shape of the stop lug 10a can be seen particularly well in FIG. 5 to FIG. 8.

Figure 9:
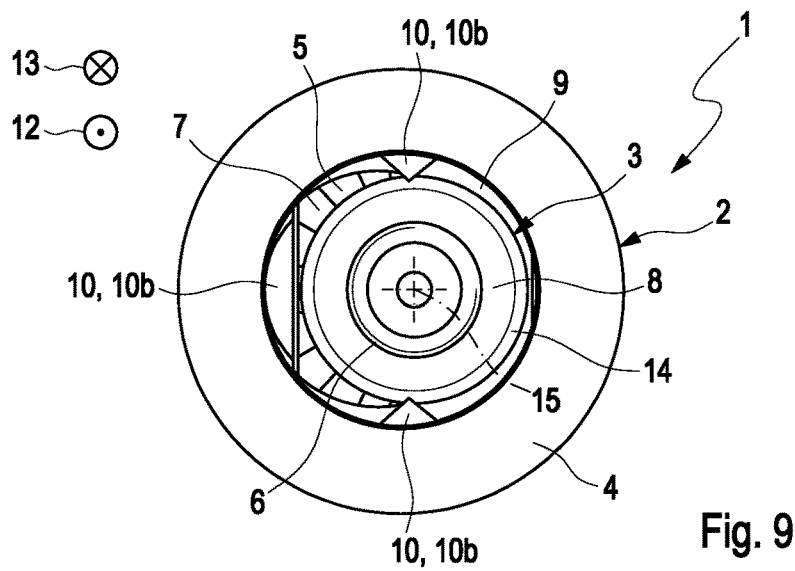
FIGS. 9 to 11 show views of a fastening section comprising a collar screw with differently formed clamping projections in the pull-out direction.
Figure 10:
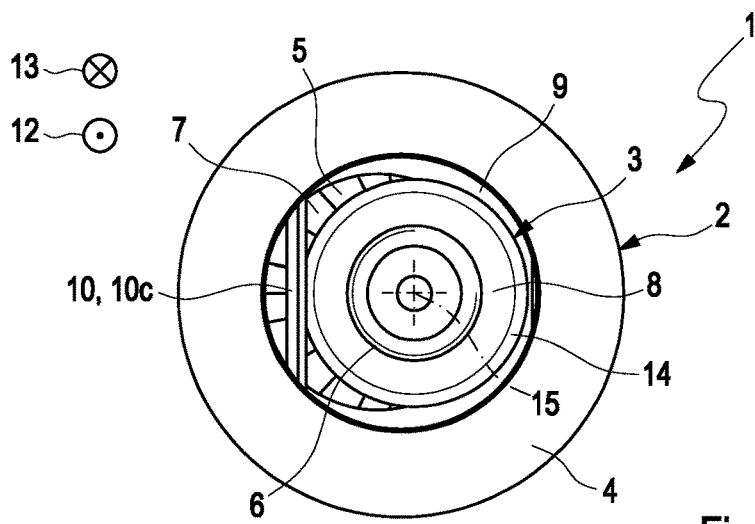
Figure 11:
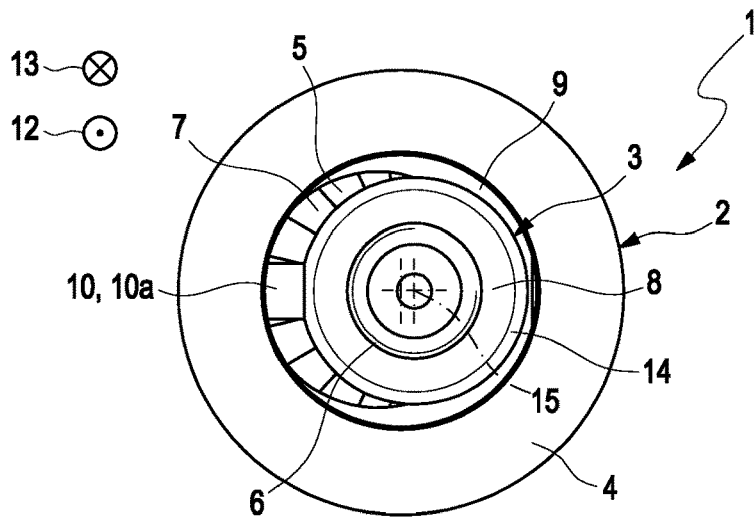
Figure 12:
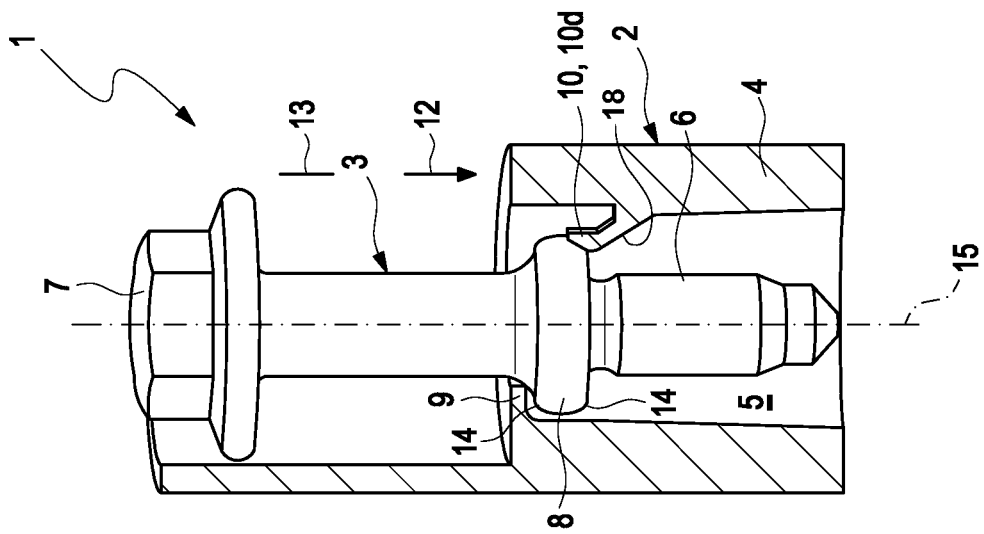
FIGS. 12 and 13 show sectional views of a fastening section comprising a collar screw and comprising differently formed clamping projections.
Figure 13:
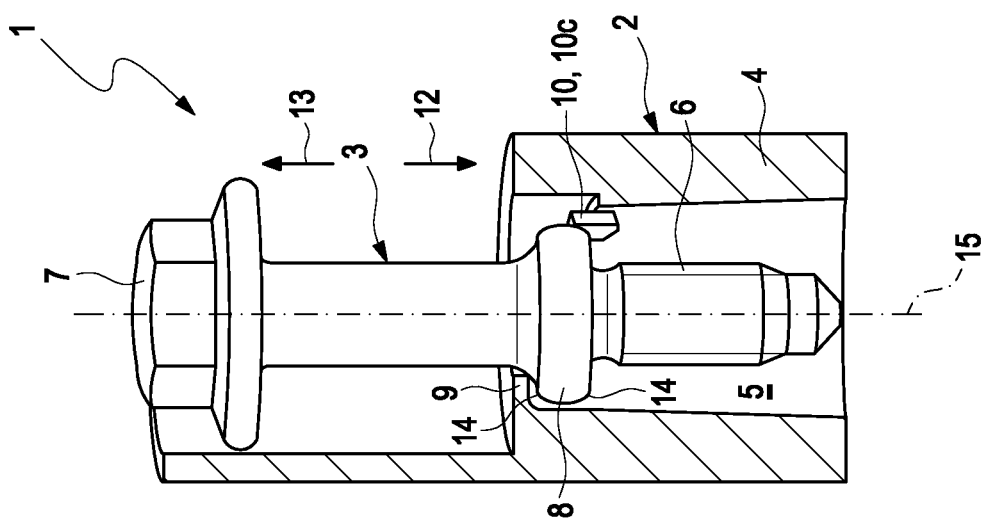

FIG. 9 to FIG. 11 show views of the fastening section 4 comprising the collar screw 3 in the pull-out direction 13. In FIG. 9 to FIG. 11, the clamping projection 10 is formed differently from the clamping projection 10 according to FIG. 1 to FIG. 8. In FIG. 9, the clamping projection 10 is formed from several support lugs 10b, which are offset radially to one another. In FIG. 10, the clamping projection 10 is a mounting bridge 10c. FIG. 12 additionally shows a sectional view of the fastening device 1 comprising the clamping projection 10 in the shape of the mounting bridge 10c. According to FIG. 11, the clamping projection 10 is formed in the shape of the stop lug 10a, which, however, has a different shape than in FIG. 1 to FIG. 8. FIG. 13 now shows a sectional view of the fastening section 4 comprising the collar screw 3, wherein the clamping projection 10 is a resilient clamping lug 10d here and the slope 18.

The collar screw 3 is thereby securely clamped in the through hole 5 of the fastening section 4, independently of the shape of the clamping projection 10, and is fixed in a captive manner in the pre-assembly state. The fastening device 1 according to the invention can be embodied to be robust and without a complex tolerance adjustment.

Figure 14:
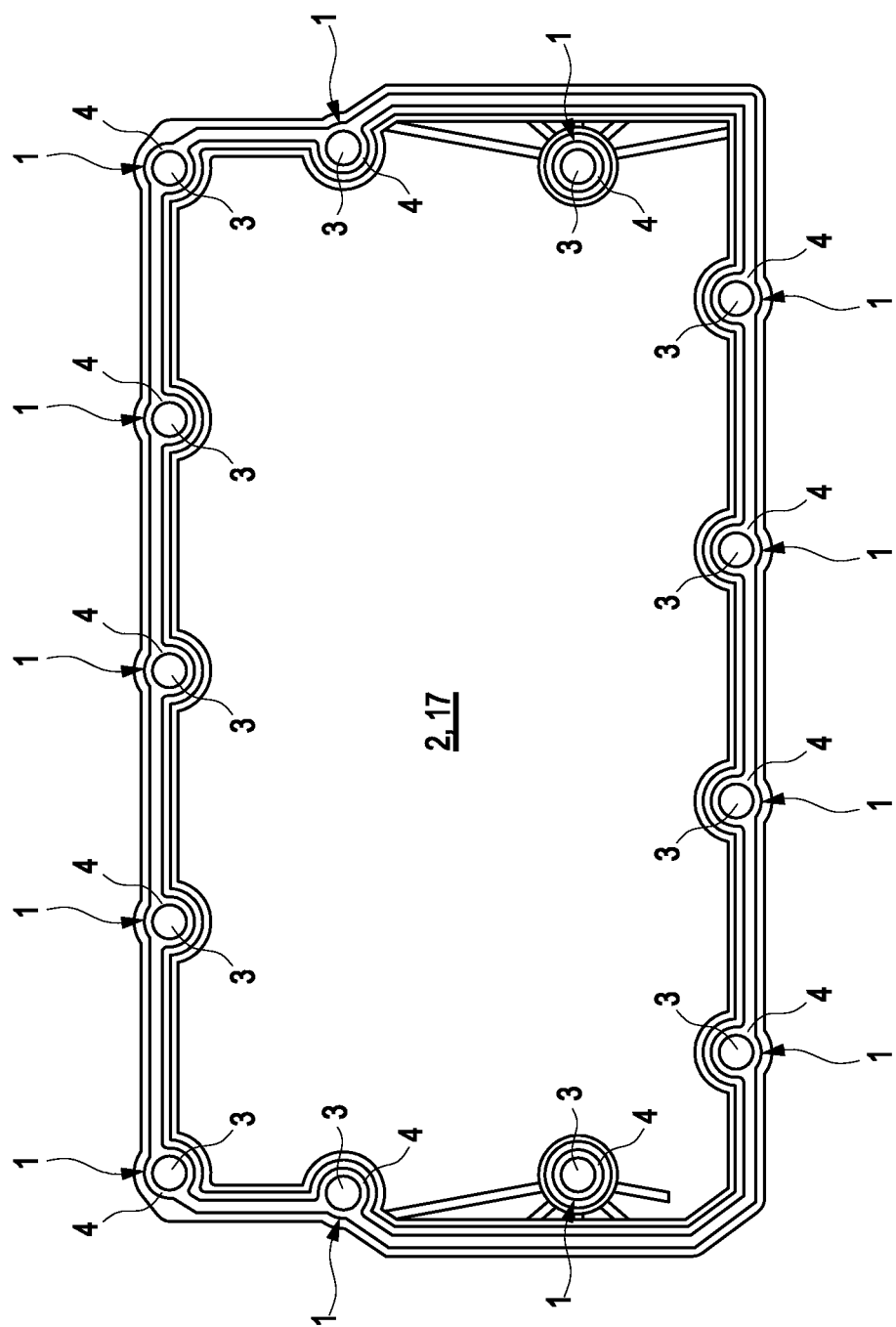
FIG. 14 shows a top view onto a component in the shape of a cylinder head cover comprising several.

FIG. 14 shows a top view onto the component 2 according to the invention in the shape of a cylinder head cover 17. The cylinder head cover 17 is formed of plastic and is fastened to a cylinder head—not shown here—by means of several fastening devices 1. The fastening sections 4 of the respective fastening devices 1 are arranged so as to be distributed on the circumference of the cylinder head cover 17 and are integrally molded thereto. The fastening devices 1 serve to secure or to fasten, respectively, the cylinder head cover 17 to the cylinder head, wherein the latter can advantageously be fastened to the cylinder head with constant pressure.

In the alternative, the component 2 can also be formed in the shape of a fresh air distributor, a suction module or a filter housing.

The invention claimed is:

1. A fastening device for securing a component to a counter piece, comprising:
   a collar screw having a thread, a screw head, and a circumferential collar formed therebetween; and
   a fastening section in which a through hole is formed, a radial stop projection and a radial clamping projection being located inside the through hole, the radial clamping projection being located radially opposite and radially offset to the radial stop projection in an insertion direction;
   wherein the collar screw is inserted into the through hole in the insertion direction, and, in a pre-assembly state, the collar of the collar screw is axially supported on the stop projection of the through hole in a pull-out direction;
   wherein the clamping projection has a slope, which is formed on the clamping projection so as to face away from the stop projection and is directed radially to the inside in the pull-out direction, and the collar of the collar screw is able to be guided on the slope in the pull-out direction and is able to be clamped between the stop projection and the clamping projection; and
   wherein, in the pre-assembly state, the collar of the collar screw is axially supported on the clamping projection in the insertion direction, and the collar screw is clamped between the stop projection and the clamping projection.

2. The fastening device according to claim 1, wherein a diameter of the collar is smaller than a diameter of the through hole in a region of the stop projection, so that the collar is able to be axially guided past the stop projection, and to be clamped between the stop projection and the clamping projection in response to the radial offsetting of the collar screw.

3. The fastening device according to claim 1, wherein:
the collar has a circumferential slope rounding, which is directed radially to the inside; and
the collar is able to be clamped between the stop projection and the clamping projection with varying force in response to the radial offsetting of the collar screw.

4. The fastening device according to claim 1, wherein at least one of:
the stop projection is horseshoe-shaped and the clamping projection is a stop lug, which are formed radially opposite one another in the through hole;
the stop projection is horseshoe-shaped and the clamping projection is formed by several support lugs, which are spaced apart from one another in the circumferential direction;
the stop projection is horseshoe-shaped and the clamping projection is a mounting bridge, which are formed radially opposite one another one another in the through hole; and
the stop projection is horseshoe-shaped and the clamping projection is a resilient clamping lug, which are formed radially opposite one another in the through hole.

5. The fastening device according to claim 1, wherein at least one of:
the thread is received completely in the through hole in the pre-assembly state and does not axially protrude from the through hole; and
the screw head is received completely in the through hole in the pre-assembly state and does not axially protrude from the through hole.

6. The fastening device according to claim 1, wherein, in the pre-assembly state, a longitudinal central axis of the collar screw, which is clamped in the through hole, is axially offset to a longitudinal central axis of the through hole.

7. The fastening device according to claim 1, wherein the stop projection and the clamping projection are formed integrally on the fastening section.

8. The fastening device according to claim 1, wherein the fastening section is formed of plastic.

9. A component comprising at least one fastening device having:
a collar screw having a thread, a screw head, and a circumferential collar formed therebetween; and
a fastening section in which a through hole is formed, a radial stop projection and a radial clamping projection being located inside the through hole, the clamping projection being located radially opposite and radially offset to the stop projection in an insertion direction;
wherein the collar screw is inserted into the through hole in the insertion direction, and, in a pre-assembly state, the collar is axially supported on the stop projection in a pull-out direction;
wherein, in the pre-assembly state, the collar is axially supported on the clamping projection in the insertion direction, and the collar screw is clamped between the stop projection and the clamping projection; and
wherein the fastening section of the respective fastening device forms a region of the component, which cannot be separated from the component.

10. A method for pre-assembling a fastening device, comprising:
providing a collar screw having a thread, a screw head, and a circumferential collar formed therebetween;
inserting the collar screw into a through hole formed in a fastening section in an insertion direction, until the collar of the collar screw is axially supported on a clamping projection of the through hole in the insertion direction;
radially offsetting the collar screw in the through hole, until the collar is axially supported on a stop projection in a pull-out direction, the stop projection being located radially opposite and radially offset to the clamping projection in the insertion direction, and the clamping projection having a slope that faces away from the stop projection and is directed radially to the inside in the pull-out direction; and
guiding the collar on the slope in the pull-out direction, until the collar is clamped between the stop projection and the clamping projection, and the collar screw is axially secured in the through hole in a pre-assembly state.

11. The fastening device according to claim 9, wherein a diameter of the collar is smaller than a diameter of the through hole in a region of the stop projection, so that the collar is able to be axially guided past the stop projection, and to be clamped between the stop projection and the clamping projection in response to the radial offsetting of the collar screw.

12. The fastening device according to claim 2, wherein:
the collar has a circumferential slope rounding, which is directed radially to the inside; and
the collar is able to be clamped between the stop projection and the clamping projection with varying force in response to the radial offsetting of the collar screw.

13. The fastening device according to claim 2, wherein at least one of:
the stop projection is horseshoe-shaped and the clamping projection is a stop lug, which are formed radially opposite one another in the through hole;
the stop projection is horseshoe-shaped and the clamping projection is formed by several support lugs, which are spaced apart from one another in the circumferential direction;
the stop projection is horseshoe-shaped and the clamping projection is a mounting bridge, which are formed radially opposite one another one another in the through hole; and
the stop projection is horseshoe-shaped and the clamping projection is a resilient clamping lug, which are formed radially opposite one another in the through hole.

14. The component according to claim 9, wherein the component is a cylinder head cover, a suction module, a fresh air distributor, or a filter housing.

15. The component according to claim 9, wherein a diameter of the collar is smaller than a diameter of the through hole in a region of the stop projection, so that the collar is able to be axially guided past the stop projection, and to be clamped between the stop projection and the clamping projection in response to the radial offsetting of the collar screw.

16. The component according to claim 9, wherein:
the collar has a circumferential slope rounding, which is directed radially to the inside; and
the collar is able to be clamped between the stop projection and the clamping projection with varying force in response to the radial offsetting of the collar screw.

17. The component according to claim 9, wherein at least one of:
- the stop projection is horseshoe-shaped and the clamping projection is a stop lug, which are formed radially opposite one another in the through hole;
- the stop projection is horseshoe-shaped and the clamping projection is formed by several support lugs, which are spaced apart from one another in the circumferential direction;
- the stop projection is horseshoe-shaped and the clamping projection is a mounting bridge, which are formed radially opposite one another one another in the through hole; and
- the stop projection is horseshoe-shaped and the clamping projection is a resilient clamping lug, which are formed radially opposite one another in the through hole.

18. The component according to claim 9, wherein:
- the clamping projection has a slope, which is formed on the clamping projection so as to face away from the stop projection and is directed radially to the inside in the pull-out direction; and
- the collar of the collar screw is able to be guided on the slope in the pull-out direction and is able to be clamped between the stop projection and the clamping projection.

19. The component according to claim 9, wherein at least one of:
- the thread is received completely in the through hole in the pre-assembly state and does not axially protrude from the through hole; and
- the screw head is received completely in the through hole in the pre-assembly state and does not axially protrude from the through hole.

20. The component according to claim 9, wherein, in the pre-assembly state, a longitudinal central axis of the collar screw, which is clamped in the through hole, is axially offset to a longitudinal central axis of the through hole.

* * * * *